(12) United States Patent
Dunne

(10) Patent No.: US 7,349,073 B2
(45) Date of Patent: Mar. 25, 2008

(54) EFFICIENT OPTICAL SYSTEM AND BEAM PATHWAY DESIGN FOR LASER-BASED DISTANCE MEASURING DEVICE

(75) Inventor: Jeremy G. Dunne, Highlands Ranch, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 396 days.

(21) Appl. No.: 10/922,572

(22) Filed: Aug. 20, 2004

(65) Prior Publication Data

US 2006/0039065 A1   Feb. 23, 2006

(51) Int. Cl.
*G01C 3/08* (2006.01)

(52) U.S. Cl. .................................... 356/4.01

(58) Field of Classification Search ............... 359/246, 359/362, 399, 405, 412, 424, 428, 638, 833, 359/834, 836, 838, 400, 403, 404, 419; 356/4.01, 356/5.1, 5.01, 152, 5; 250/342, 347
See application file for complete search history.

(56) References Cited

U.S. PATENT DOCUMENTS

| | | | |
|---|---|---|---|
| 3,424,516 A | 1/1969 | Snyder | |
| 3,484,149 A | 12/1969 | Becker et al. | |
| 3,541,919 A | 11/1970 | Weyrauch | |
| 3,814,496 A | 6/1974 | Muka | |
| 4,165,936 A | 8/1979 | Eisenring et al. | |
| 4,810,088 A * | 3/1989 | Karning et al. ............ | 356/4.01 |
| 4,886,347 A | 12/1989 | Monroe | |
| 5,126,549 A | 6/1992 | Yamada | |
| 5,161,242 A * | 11/1992 | Boulay ........................ | 701/222 |
| 5,245,469 A * | 9/1993 | Goto ........................... | 359/362 |
| 5,291,263 A | 3/1994 | Kong | |
| 5,444,568 A | 8/1995 | Williams et al. | |
| 5,517,297 A | 5/1996 | Stenton | |
| 5,694,202 A | 12/1997 | Mladjan et al. | |
| 5,745,287 A * | 4/1998 | Sauter ......................... | 359/428 |
| 5,774,208 A | 6/1998 | Abe | |
| 5,781,281 A | 7/1998 | Miyano | |
| 5,835,276 A | 11/1998 | Asai et al. | |
| 6,031,606 A | 2/2000 | Bayer et al. | |
| 6,236,504 B1 | 5/2001 | Kao et al. | |
| 6,292,314 B1 * | 9/2001 | Perger ......................... | 359/834 |
| 6,344,894 B1 | 2/2002 | Liou | |
| 6,411,371 B1 * | 6/2002 | Hinderling et al. ......... | 356/4.01 |
| 6,945,657 B2 * | 9/2005 | Shirai et al. ................ | 359/608 |
| 7,031,062 B2 | 4/2006 | Kao | |
| 2004/0046953 A1 * | 3/2004 | Nagata et al. .............. | 356/4.01 |
| 2005/0001168 A1 * | 1/2005 | Amon et al. ................ | 250/353 |

\* cited by examiner

*Primary Examiner*—Stephone B. Allen
*Assistant Examiner*—Jennifer L Doak
(74) *Attorney, Agent, or Firm*—William J. Kubida; Michael C. Martensen; Hogan & Hartson LLP

(57) ABSTRACT

An efficient optical system and beam transmission and reception pathway design of particular applicability in the implementation of a cost effective, compact laser-based range-finding instrument. The design is one in which the visual pathway may be made coincident with either the laser transmission or laser reception pathway and may conveniently be implemented in conjunction with a low cost liquid crystal display (LCD) aiming reticle and head up (HUD) information display or in conjunction with a light emitting diode (LED) element. In accordance with the present invention, relatively inexpensive plate mirrors may be used to replace more conventional and costly prism-based implementations.

25 Claims, 7 Drawing Sheets

US 7,349,073 B2

EFFICIENT OPTICAL SYSTEM AND BEAM PATHWAY DESIGN FOR LASER-BASED DISTANCE MEASURING DEVICE

BACKGROUND OF THE INVENTION

The present invention relates, in general, to the field of signal transmitting and receiving rangefinding devices. More particularly, the present invention relates to a simplified, cost effective and efficient optical system and beam pathway design for laser-based distance measuring, or range-finding, devices.

Representative implementations of optical pathways for various optical instruments, including laser-based rangefinders, are described in, for example, U.S. Pat. No. 6,236,504 issuing May 22, 2001 for "Method and Device for Adjusting Eye Range by Means of Displacements of Prisms and Ocular Lenses"; U.S. Pat. No. 6,292,314 issuing Sep. 18, 2001 for "Prism System for Image Inversion in a Visual Observation Beam Path"; and U.S. Pat. No. 6,344,894 issuing Feb. 5, 2002 for: "Optical Axis Adjusting Structure for a Range Finder". These comparatively complicated designs require the use of two or more relatively costly prisms along with as many as six or seven polished faces resulting in large, expensively implemented systems having little flexibility in the use of more than one type of in-sight display technologies.

While generally representative of the current state of the art in such designs, the afore-mentioned patents all describe systems of lenses and prisms which are relatively complex to implement, space inefficient, as well as costly to manufacture and assemble. Therefore, a need exists for a simplified, cost-effective and efficient optical system and beam pathway design which provides significant advantages over current conventional designs while nevertheless providing an accurate foundation for a compact, range-finding instrument having excellent beam transmission/reception and optical properties.

SUMMARY OF THE INVENTION

Disclosed herein is an optical system and beam transmission and reception pathway design of particular applicability in the implementation of a cost effective, compact laser-based range-finding instrument. The design is one in which the visual pathway may be made coincident with either the laser transmission or laser reception pathway and may conveniently be implemented in conjunction with a low cost liquid crystal display (LCD) aiming reticle and head up (HUD) information display or in conjunction with a light emitting diode (LED) element. In accordance with the present invention, relatively inexpensive plate mirrors may be used to replace more conventional and costly prism-based implementations.

Particularly disclosed herein is a system for a beam transmitting and receiving instrument which comprises a beam emitting device for producing an emitted beam along a first path, a beam redirecting device for intercepting the emitted beam and producing a redirected beam for direction through a transmission aperture toward a target along a second path, a first at least partially reflective surface disposed at an angle transversely along the first path and a second at least partially reflective surface disposed proximately to the first at least partially reflective surface. Functionally, a visual image of the target is presented at a visual aperture of the instrument along a visual path substantially comprising the second path and the first path to the first and second at least partially reflective surfaces to the visual aperture.

Also particularly disclosed herein is a system for a beam transmitting and receiving instrument comprising a beam emitting device for producing an emitted beam along a first path, a beam redirecting device for intercepting a reflection of the emitted beam through a reception aperture and producing a redirected beam for direction toward a beam detecting device along a second path, a first at least partially reflective surface disposed at an angle transversely along the second path for allowing the reflection of the emitted beam to substantially pass therethrough to the beam detecting device and a second at least partially reflective surface disposed proximately to the first at least partially reflective surface. Functionally, a visual image of the target is presented at a visual aperture of the instrument through the reception aperture along a visual path substantially comprising the second path to the first and second at least partially reflective surfaces to the visual aperture.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
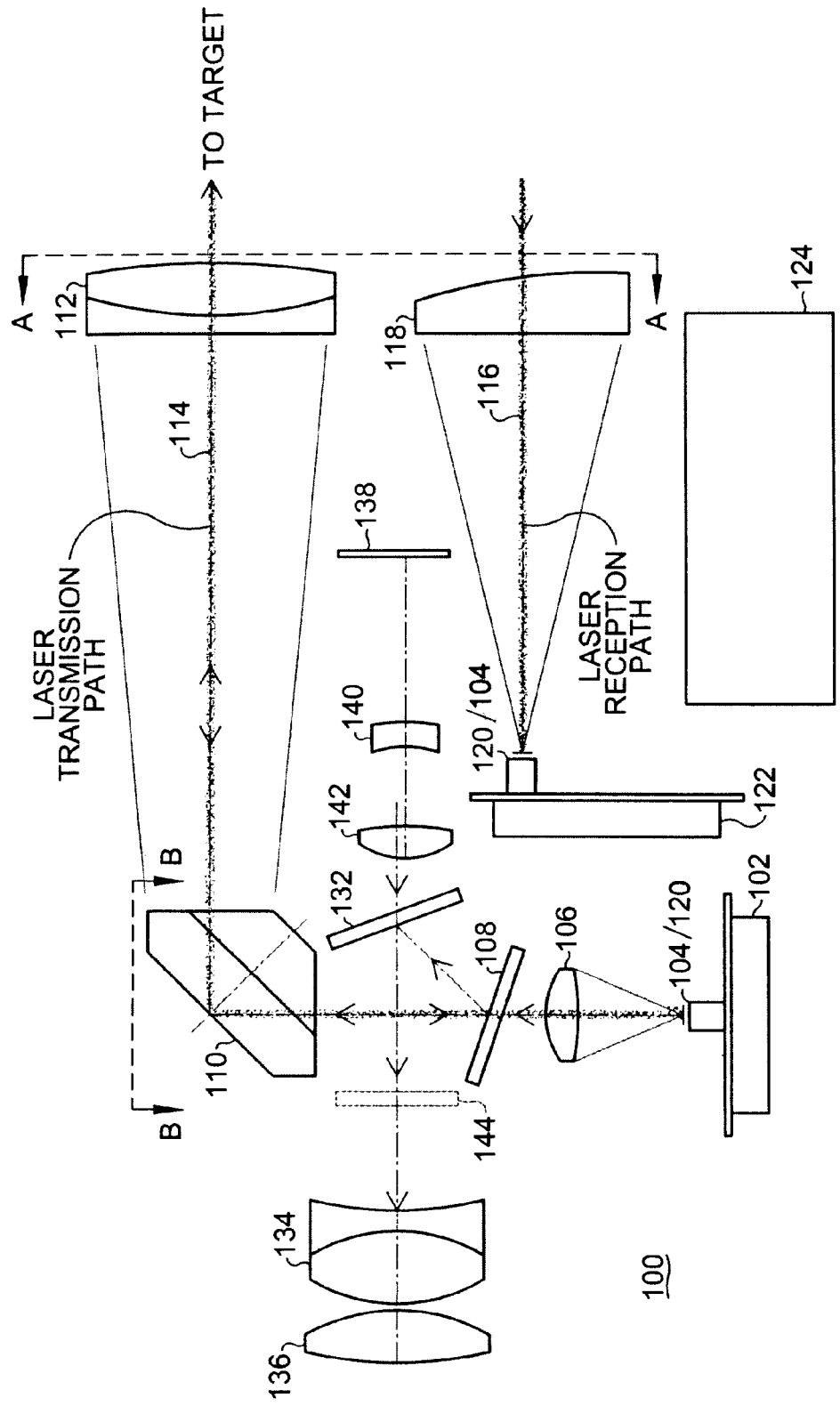
FIG. 1A is a simplified diagrammatic illustration of a representative embodiment of an optical system and beam pathway design in accordance with the present invention illustrating the beam transmission and reception paths thereof.

With reference now to FIG. 1A, a cost and space efficient optical system 100 and beam pathway design for a laser-based distance measuring device is shown with respect to the laser transmission and reception paths thereof in particular.

The system 100 comprises, in pertinent part, a laser transmission board 102 including a laser light emitting element 104. The laser light emitting element 104 projects a pulsed infrared laser beam along a laser transmission path through a first lens 106 and an infrared dichroic mirror 108 to an Amici prism 110. The Amici prism 110, also sometimes referred to as a "roof prism" is a right angle prism in which the hypotenuse has been replaced by a roof wherein two flat faces meet at a 90° angle. The laser beam exits the Amici prism 110 towards the objective lens 112. Objective lens 112 collimates the laser beam towards the target.

The focal length of the laser transmission path 114 is, in a preferred embodiment of the present invention, substantially 60.0 mm while the focal length of the objective lens 112 is substantially between 130.0-140.0 mm.

Laser pulses reflected from a target are received by the system 100 as indicated by the laser reception path 116 through an aspheric lens 118. An aspheric lens is one having at least one face which is shaped to a surface of revolution about the lens axis, including conic sections except that of a sphere. Laser light incident upon a laser receiving diode or device 120 is amplified and processed by a receiver board 122. In the exemplary embodiment of the present invention illustrated, the focal length from the aspheric lens 118 to the laser receiving diode 120 is substantially 60.0 mm.

Figure 1B:
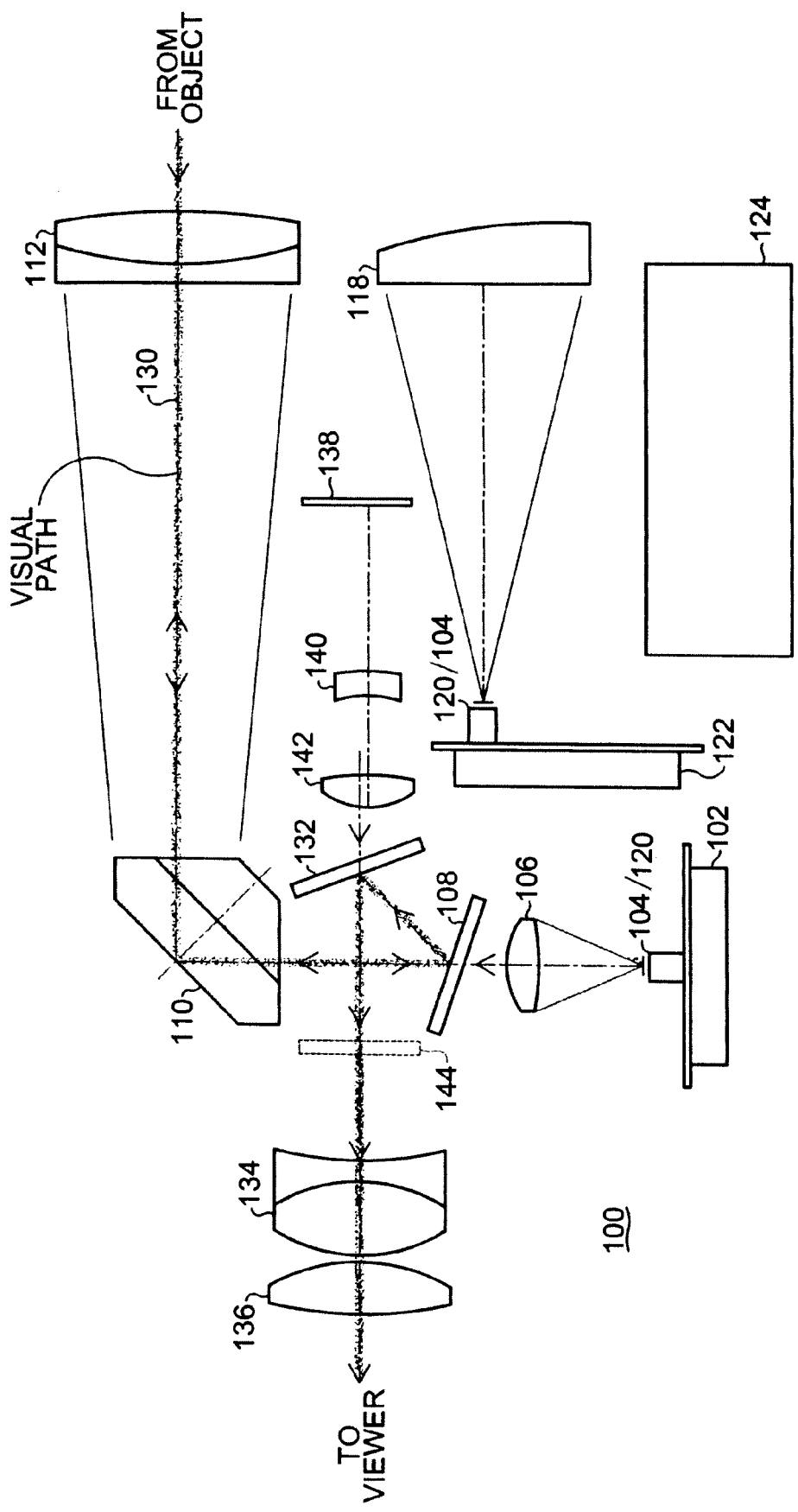
FIG. 1B is a corresponding diagrammatic illustration of the representative embodiment of the preceding figure illustrating, in particular, the visual path for the viewing of a target towards which a range-finding device incorporating the same may be aimed in conjunction with an aiming reticle and an in-sight head up display (HUD) coincident with the beam transmission path.

With reference additionally now to FIG. 1B, the system 100 of the preceding figure is shown with respect to the visual path thereof in particular. Like structure to that previously illustrated and described is like numbered and the foregoing description thereof shall suffice herefor.

Visible light reflected from the target towards which the laser-based distance measuring device (or laser rangefinder) is aimed, as well as that of surrounding objects and terrain, enters the system 100 through lens 112 along visual path 130 as shown whereupon it impinges upon a beam redirecting device such as an Amici prism 110. Functionally, the Amici prism 110 performs image erection while deflecting the incident light by 90°, which is essentially the same as rotating the image by 180°. In other words, the image is reversed left to right and simultaneously inverted top to bottom.

The visual path 130 is reflected 90° by the Amici prism 110 to be presented to the dichroic mirror 108 where it is reflected back at an acute angle to a full mirror 132. Mirror 132 may, in certain embodiments of the present invention, also comprise a full (or silver) mirror (e.g. when an LCD display is used), a red dichroic (e.g. when an LED display is used) or another mirror type depending upon the particular implementation of an insight, head up display (HUD) as will be more fully described hereinafter. A dichroic mirror is one which is used to selectively reflect light according to its wavelength and not its plane of vibration. The mirror 132 then reflects the incident light back to a viewer, or user, of the laser rangefinder embodying the system 100 through a series of lenses 134 and 136 as shown.

In an embodiment of the system 100 optionally including an insight display, an aiming reticle together with information with respect to the distance from the target measured by the laser rangefinder as well as an indication of the units of measure (e.g. yards, feet, meters, degrees and the like) as well as other system 100 or ancillary target related data may be displayed to the user superimposed upon the visual image received along the visual path 130 by means of a micro-light emitting diode (LED) 138 or other light emitting display device. With respect to the representative embodiment of the present invention illustrated, the LED 138 may be positioned at a slight offset to the centerline of a lens 140 which positioned is in line with an aspheric relay lens 142. The aspheric relay lens 142 is itself, positioned at a slight offset to the centerline of the mirror 132, in this case a dichroic mirror, which allows a view of the reticle and any accompanying visual information to pass through the mirror 132 to be viewed together with the target image through the eye piece lenses 134 and 136. The lenses 140 and 142 may be conveniently provided as inexpensive molded plastic lenses.

In an alternative embodiment of the system 100 optionally including an insight display, an aiming reticle together with information with respect to the distance from the target measured by the laser rangefinder as well as an indication of the units of measure (e.g. yards, feet, meters, degrees and the like) as well as other system 100 or ancillary target related data may be displayed to the user superimposed upon the visual image received along the visual path 130 by means of a liquid crystal display (LCD) 144 or other similar device. In this alternative embodiment, the mirror 132 may comprise a full mirror in lieu of a dichroic mirror.

It should be noted that in further alternative embodiments of the present invention, the visual path 130 may be coincident with the laser reception path 116 in lieu of the laser transmission path 114 without departing from the scope of the disclosure presented herein. In this regard, the positions of the light emitting element 104 and the light receiving diode or device 120 would be interchanged.

Figure 2:
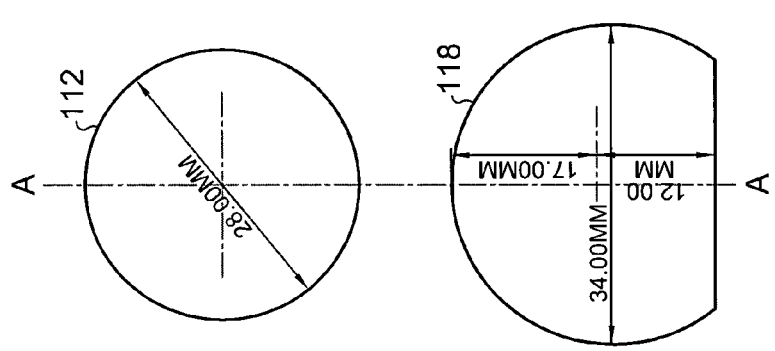
FIG. 2 illustrates, in greater detail, a front elevational view and representative dimensions for the transmission and reception lens within the respective apertures depicted in the preceding figures taken substantially along section line A-A.

With reference additionally now to FIG. 2, a front elevational view and representative dimensions is shown for the transmission 112 and reception lens 118 within the respective apertures depicted in the preceding figures taken substantially along section line A-A.

Figure 3:
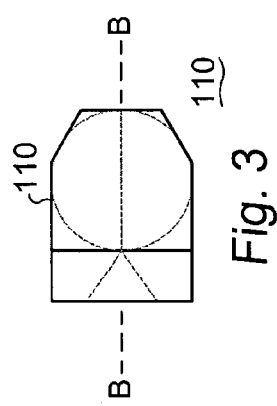
FIG. 3 illustrates, a top plan view of the beam redirecting Amici prism illustrated in FIGS. 1A and 1B utilized in the beam transmission and visual paths thereof taken substantially along section line B-B.

With reference additionally now to FIG. 3, a top plan view of the beam redirecting Amici prism 110 previously illustrated in FIGS. 1A and 1B is shown as utilized in the beam transmission and visual paths thereof taken substantially along section line B-B. The Amici prism 110 may, in the representative embodiment shown, have an entrance/exit of approximately 15 mm×15 mm.

Figure 4:
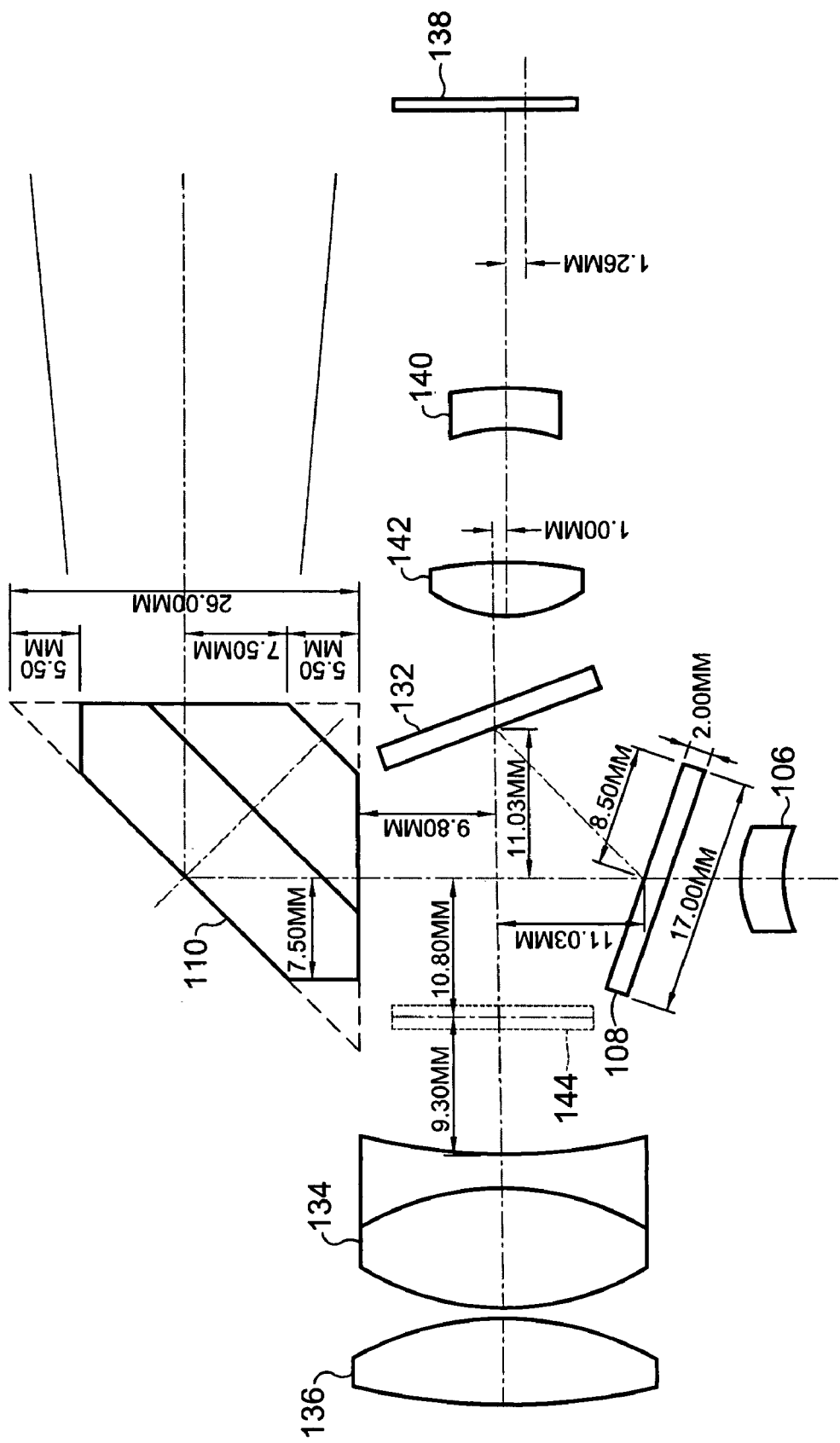
FIG. 4 illustrates, in greater detail, a diagrammatic illustration of portions of the representative embodiment of an optical system and beam pathway design of FIGS. 1A and 1B along with representative dimensions and relative positions thereof.

With reference additionally now to FIG. 4, a diagrammatic illustration of portions of the representative embodiment of an optical system and beam pathway design of FIGS. 1A and 1B is shown in more detail along with representative dimensions and the relative positions thereof.

Figure 5:
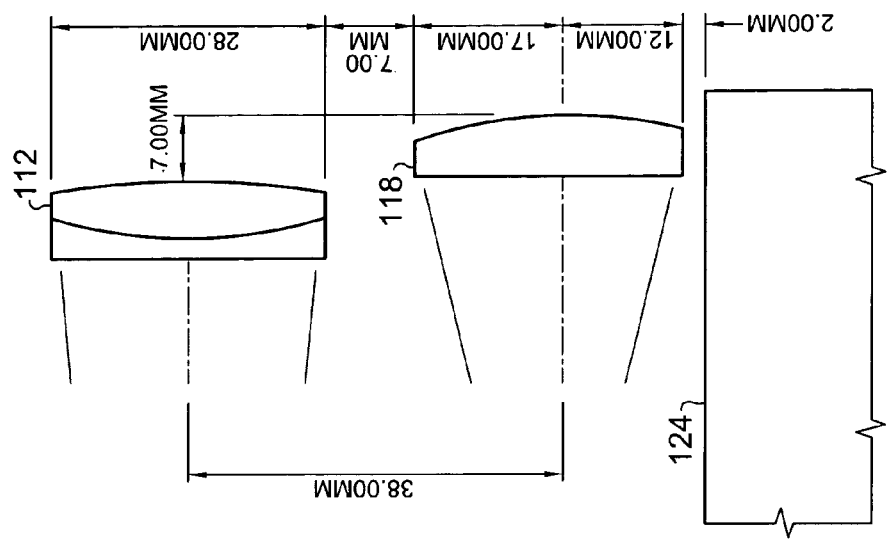
FIG. 5 illustrates, in greater detail, the beam transmission and reception lenses of FIGS. 1A and 1B along with the representative dimensions and relative positions thereof.

With reference additionally now to FIG. 5, the beam transmission and reception lenses 112, 118 of FIGS. 1A and 1B are shown in greater detail along with the representative dimensions and relative positions thereof.

Figure 6:
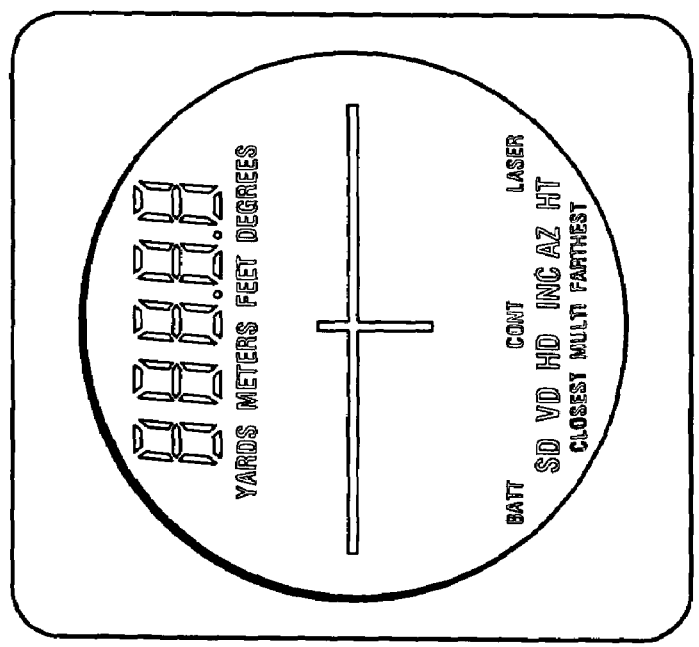
FIG. 6 is a simplified illustration of a possible arrangement of an aiming reticle and representative insight display of information which may be provided to a user of a range-finding device incorporating the optical system and beam pathway of the present invention when provided, for example, in the form of a liquid crystal display (LCD)
Figure 8A:
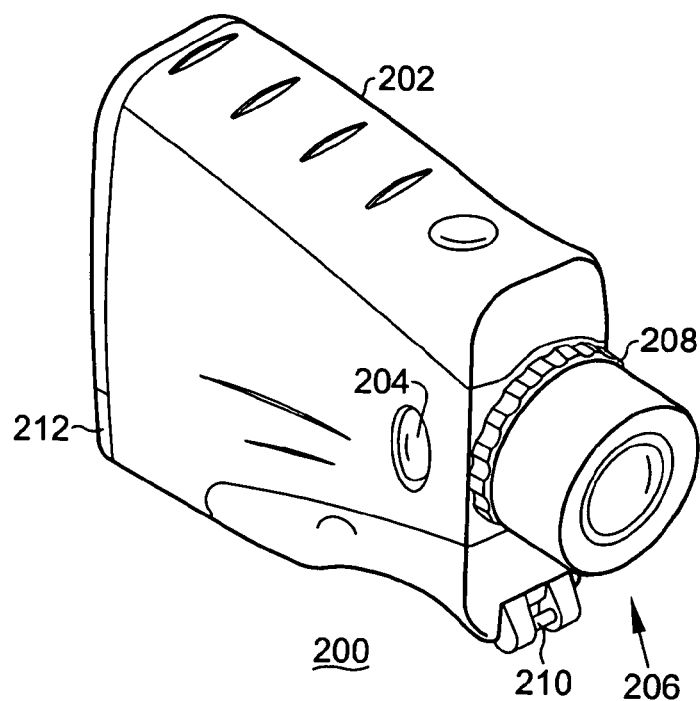
FIG. 8A is a rear isometric view of a possible physical implementation of a laser-based range-finding instrument incorporating the optical system and beam pathway of the present invention.
Figure 8B:
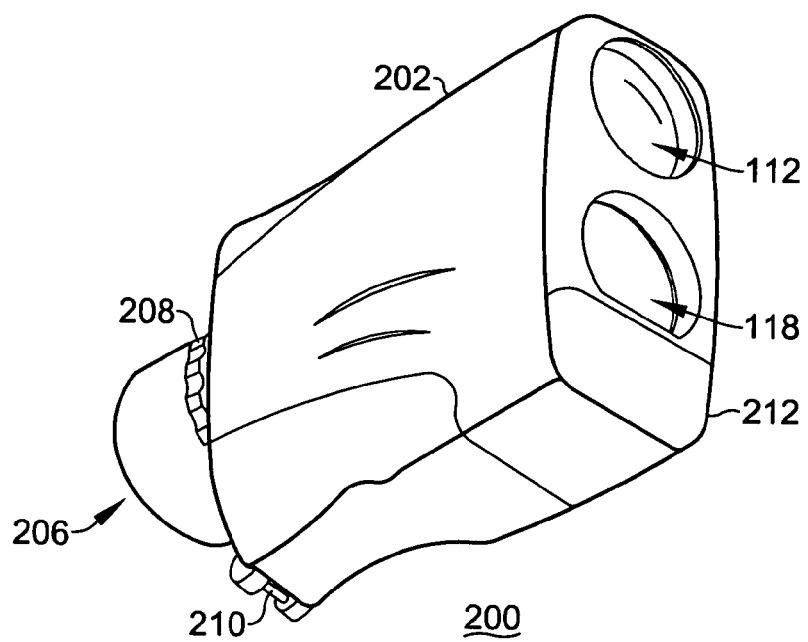
FIG. 8B is a further front isometric view of the representative range-finding instrument of FIG. 8A.
Figure 8C:
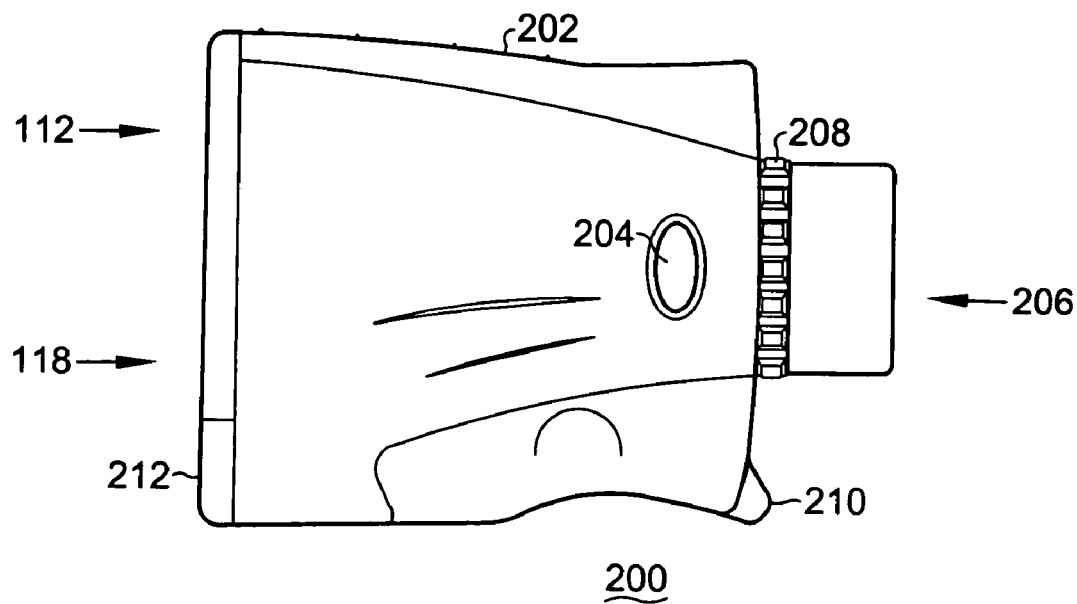
FIG. 8C is an additional side elevational view of the representative range-finding instrument of FIGS. 8A and 8B.
Figures 8D, 8E:
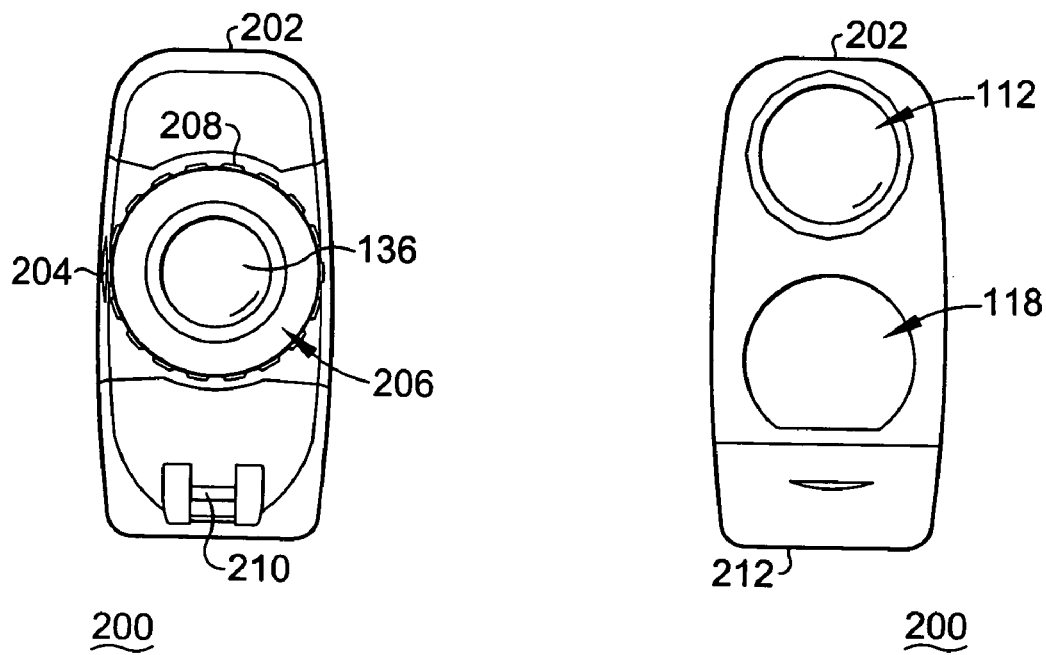
FIG. 8D is a rear elevational view of the representative range-finding instrument of FIGS. 8A through 8C inclusive.
FIG. 8E is a front elevational view of the representative range-finding instrument of FIGS. 8A through 8D inclusive.

With reference additionally now to FIG. 6, a possible arrangement of an aiming reticle and representative insight display 144 is shown which may be provided to a user of a range-finding device incorporating the optical system and beam pathway of the present invention when provided, for example, in the form of a liquid crystal display (LCD).

Figure 7:
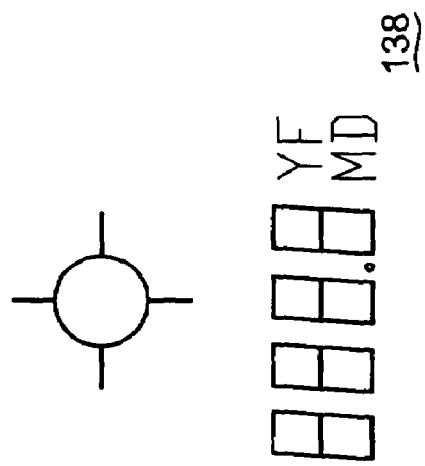
FIG. 7 is a simplified illustration of an alternative arrangement of an aiming reticle and representative insight display of information which may be provided to a user of a range-finding device incorporating the optical system and beam pathway of the present invention when provided, for example, in the form or a micro light emitting diode (LED) display.

With reference additionally now to FIG. 7, an alternative arrangement of an aiming reticle and representative insight display 138 is shown which may be provided to a user of a range-finding device incorporating the optical system and beam pathway of the present invention when provided, for example, in the form or a micro light emitting diode (LED) display.

With reference additionally now to FIGS. 8A through 8E, respective rear isometric, front isometric, side, rear and front elevational views of a possible physical implementation of a laser-based range-finding instrument 200 are shown which may incorporate the optical system 100 and beam pathway of the present invention. The instrument 200 comprises, in pertinent part, a hand-held housing 202 and user actuatable beam "fire" and/or operational mode switch 204. An eyepiece 206 is placed to the user's eye to enable the instrument 200 to be used to identify, and be aimed at, a target to which range is to be determined and displayed on either an LCD display 144 or LED display 138.

A convenient diopter adjustment wheel 208 also enables the user to pre-focus the visual path of the instrument 200 by altering the relative positions of the lenses 134 and 136 (FIGS. 1A and 1B) to his own particular eyesight requirements. A carrying strap for the instrument 200 may be attached at location 210, while the battery 124 is accessible through compartment cover 212 in the front of the housing 202.

While there have been described above the principles of the present invention in conjunction with specific components and various arrangements thereof, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system for a beam transmitting and receiving instrument comprising:
   a beam emitting device for producing an emitted beam along a first path;
   a beam redirecting device for intercepting said emitted beam along said first path and producing a redirected beam for direction through a transmission aperture toward a target along a second path;
   a first at least partially reflective surface disposed at an angle transversely along said first path;
   a second at least partially reflective surface disposed proximately to said first at least partially reflective surface, such that a visual image of said target is presented at a visual aperture of said instrument along a visual path substantially comprising said second path and said first path to said first and second at least partially reflective surfaces to said visual aperture; and
   a light emitting display viewable through said second at least partially reflective surface, and wherein said second at least partially reflective surface comprises a dichroic mirror for allowing light produced by said light emitting display to at least partially pass through from said light emitting display to said visual aperture.

2. The system of claim 1 wherein said light emitting display comprises a light emitting diode display.

3. The system of claim 1 further comprising at least one relay lens interposed between said light emitting display and said second at least partially reflective surface wherein said at least one relay lens comprises an aspheric lens that is offset with respect to a centerline of said second at least partially reflective surface.

4. The system of claim 1 further comprising a visual display viewable between said visual aperture and said second at least partially reflective surface.

5. The system of claim 1 wherein said beam emitting device comprises a laser emitting diode.

6. The system of claim 1 wherein said first at least partially reflective surface comprises a dichroic mirror for allowing said emitted beam to at least partially pass through from said beam emitting device to said beam redirecting device.

7. The system of claim 1 further comprising at least one lens positioned within said transmission aperture.

8. The system of claim 1 further comprising at least one lens positioned within said visual aperture.

9. The system of claim 1 wherein said beam redirecting device comprises an Amici prism.

10. The system of claim 1 further comprising a reception aperture for receiving a reflection of said emitted beam from said target along a reception path substantially parallel to said second path.

11. The system of claim 10 further comprising a laser receiving diode positioned on said reception path for detecting said reflection of said emitted beam.

12. The system or claim 10 further comprising at least one aspheric lens positioned within said reception aperture.

13. The system of claim 1 further comprising a transmission aperture for transmitting said emitted beam toward said target along a transmission path substantially parallel to said second path.

14. A system for a beam transmitting and receiving instrument comprising:
    a beam emitting device for producing an emitted beam along a first path and redirected via a beam redirecting device toward a target along a second path;
    a beam detecting device for receiving a reflection of said emitted beam through a reception aperture along said second path;

a first at least partially reflective surface disposed at an angle transversely along said second path for allowing said reflection of said emitted beam to substantially pass therethrough to said beam detecting device;

a second at least partially reflective surface disposed proximately to said first at least partially reflective surface, such that a visual image of said target is presented at a visual aperture of said instrument through said reception aperture along a visual path substantially comprising said second path to said first and second at least partially reflective surfaces to said visual aperture.

15. The system of claim 14 further comprising a visual display viewable through said second at least partially reflective surface.

16. The system of claim 14 wherein said visual display comprises a light emitting diode display.

17. The system of claim 16 wherein said second at least partially reflective surface comprises a dichroic mirror for allowing light produced by said light emitting diode display to at least partially pass through from said light emitting diode display to said visual aperture.

18. The system of claim 17 further comprising at least one relay lens interposed between said light emitting display and said second at least partially reflective surface wherein said at least one relay lens comprises an aspheric lens that is offset with respect to a centerline of said second at least partially reflective surface.

19. The system of claim 14 further comprising a visual display viewable between said visual aperture and said second at least partially reflective surface.

20. The system of claim 14 wherein said beam emitting device comprises a laser emitting diode.

21. The system of claim 14 wherein said first at least partially reflective surface comprises a dichroic mirror for allowing said reflection of said emitted beam to at least partially pass through from said beam redirecting device to said beam detecting device.

22. The system of claim 14 further comprising at least one aspheric lens positioned within said reception aperture.

23. The system of claim 14 further comprising at least one lens positioned within said visual aperture.

24. The system of claim 14 wherein said beam detecting device comprises a laser detecting diode.

25. The system or claim 14 further comprising at least one lens positioned within said transmission aperture.

* * * * *

UNITED STATES PATENT AND TRADEMARK OFFICE
CERTIFICATE OF CORRECTION

PATENT NO. : 7,349,073 B2 Page 1 of 1
APPLICATION NO. : 10/922572
DATED : March 25, 2008
INVENTOR(S) : Dunne It is certified that error appears in the above-identified patent and that said Letters Patent is hereby corrected as shown below:

Column 6, line 53 "or" should be --of--

Column 8, line 21 "or" should be --of--

Signed and Sealed this

Thirtieth Day of September, 2008

JON W. DUDAS
*Director of the United States Patent and Trademark Office*